United States Patent
Liu et al.

(10) Patent No.: US 9,873,102 B2
(45) Date of Patent: Jan. 23, 2018

(54) CATALYTIC DEVICES

(71) Applicants: Ming Liu, Riverside, CA (US); Xiang Zhang, Alamo, CA (US)

(72) Inventors: Ming Liu, Riverside, CA (US); Xiang Zhang, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 263 days.

(21) Appl. No.: 14/589,620

(22) Filed: Jan. 5, 2015

(65) Prior Publication Data

US 2015/0196888 A1    Jul. 16, 2015

Related U.S. Application Data

(60) Provisional application No. 61/926,803, filed on Jan. 13, 2014.

(51) Int. Cl.
| | |
|---|---|
| *B01J 19/08* | (2006.01) |
| *C25B 11/04* | (2006.01) |
| *B01J 37/02* | (2006.01) |
| *B01J 21/08* | (2006.01) |
| *B01J 23/40* | (2006.01) |
| *B01J 23/42* | (2006.01) |
| *B01J 23/70* | (2006.01) |
| *B01J 23/72* | (2006.01) |

(52) U.S. Cl.
CPC ............. *B01J 19/087* (2013.01); *B01J 21/08* (2013.01); *B01J 23/40* (2013.01); *B01J 23/42* (2013.01); *B01J 23/70* (2013.01); *B01J 23/72* (2013.01); *B01J 37/0223* (2013.01); *B01J 37/0225* (2013.01); *C25B 11/0473* (2013.01); *B01J 2219/0803* (2013.01); *B01J 2219/0875* (2013.01); *B01J 2219/0892* (2013.01)

(58) Field of Classification Search
CPC .............. B01J 19/087; B01J 2219/0803; B01J 2219/0875; B01J 2219/0892; B01J 21/08; B01J 23/40; B01J 23/42; B01J 23/70; B01J 23/72; B01J 37/0223; B01J 37/0225; C25B 11/0473; H01M 4/926; H01L 29/1606; H01L 29/66431; H01L 29/778; H01L 29/66045; H01L 29/786; H01L 29/401; H01L 29/66742; H01L 29/454; H01L 29/456; H01L 29/861; H01L 29/413; H01L 21/28506; H01L 21/32055; H01L 29/45; H01B 1/04; Y10S 977/9365

See application file for complete search history.

(56) References Cited

U.S. PATENT DOCUMENTS

2012/0256167 A1* 10/2012 Heo .................... H01L 29/1606
                                                                257/27

OTHER PUBLICATIONS

Choi, Y., et al., Single-Molecule Lysozyme Dynamics Monitored by an Electronic Circuit. Science, 2012. 335(6066): p. 319-324.

(Continued)

*Primary Examiner* — Xiuyu Tai

(57) ABSTRACT

This disclosure provides systems, methods, and apparatus related to catalytic devices. In one aspect, a device includes a substrate, an electrically insulating layer disposed on the substrate, a layer of material disposed on the electrically insulating layer, and a catalyst disposed on the layer of material. The substrate comprises an electrically conductive material. The substrate and the layer of material are electrically coupled to one another and configured to have a voltage applied across them.

20 Claims, 3 Drawing Sheets

(56) References Cited

OTHER PUBLICATIONS

Kong, J., et al., Nanotube molecular wires as chemical sensors. Science, 2000. 287(5453): p. 622-625.

Schedin, F., et al., Detection of individual gas molecules adsorbed on graphene. Nature Materials, 2007. 6(9): p. 652-655.

Deshlahra, P., et al., Direct Control of Electron Transfer to the Surface-CO Bond on a Pt/TiO2 Catalytic Diode. Journal of the American Chemical Society, 2011. 133(41): p. 16459-16467.

Pacchioni, G., L. Giordano, and M. Baistrocchi, Charging of Metal Atoms on Ultrathin MgO/Mo(100) Films. Physical Review Letters, 2005. 94(22): p. 226104.

Freund, H.-J., Metal-supported ultrathin oxide film systems as designable catalysts and catalyst supports. Surface Science, 2007. 601(6): p. 1438-1442.

Petek, H., et al., Real-time observation of adsorbate atom motion above a metal surface. Science, 2000. 288(5470): p. 1402-1404.

Nienhaus, H., et al., Electron-hole pair creation at Ag and Cu surfaces by adsorption of atomic hydrogen and deuterium. Physical Review Letters, 1999. 82(2): p. 446-449.

Park, J. Y., et al. Interfacial and chemical properties of Pt/TiO(2), Pd/TiO(2), and Pt/GaN catalytic nanodiodes influencing hot electron flow. Journal of Physical Chemistry C, 2007. 111(42): p. 15331-15336.

Zhang, Y., et al., Control of catalytic reactions at the surface of a metal oxide nanowire by manipulating electron density inside it. Nano Letters, 2004. 4(3): p. 403-407.

Baker, L.R., et al., Solid-State Charge-Based Device for Control of Catalytic Carbon Monoxide Oxidation on Platinum Nanofilms Using External Bias and Light. Nano Letters, 2012. 12(5): p. 2554-2558.

Zhang, Y., et al., Electronic control of chemistry and catalysis at the surface of an individual tin oxide nanowire. Journal of Physical Chemistry B, 2005. 109(5): p. 1923-1929.

Socaciu, L.D., et al., Catalytic CO oxidation by free Au-2(-): Experiment and theory. Journal of the American Chemical Society, 2003. 125(34): p. 10437-10445.

Yoon, B., et al., Charging effects on bonding and catalyzed oxidation of CO on Au-8 clusters on MgO. Science, 2005. 307(5708): p. 403-407.

Yu, Y.-J., et al., Tuning the Graphene Work Function by Electric Field Effect. Nano Letters, 2009. 9(10): p. 3430-3434.

Brar, V.W., et al., Gate-controlled ionization and screening of cobalt adatoms on a graphene surface. Nature Physics, 2011. 7(1): p. 43-47.

Chen, M.S., et al., Highly active surfaces for CO oxidation on Rh, Pd, and Pt. Surface Science, 2007. 601(23): p. 5326-5331.

Ackermann, M.D., et al., Structure and Reactivity of Surface Oxides on Pt(110) during Catalytic CO Oxidation. Physical Review Letters, 2005. 95(25): p. 255505.

Sato, Y., K. Takai, and T. Enoki, Electrically Controlled Adsorption of Oxygen in Bilayer Graphene Devices. Nano Letters, 2011. 11(8): p. 3468-3475.

Fierro-Gonzalez, J.C. and B.C. Gates, Evidence of active species in CO oxidation catalyzed by highly dispersed supported gold. Catalysis Today, 2007. 122(3-4): p. 201-210.

Pal, R., et al., Unraveling the Mechanisms of O-2 Activation by Size-Selected Gold Clusters: Transition from Superoxo to Peroxo Chemisorption. Journal of the American Chemical Society, 2012. 134(22): p. 9438-9445.

Vilhelmsen, L.B. and B. Hammer, Systematic Study of Au-6 to Au-12 Gold Clusters on MgO(100) F Centers Using Density-Functional Theory. Physical Review Letters, 2012. 108(12): p. 126101.

* cited by examiner

CATALYTIC DEVICES

RELATED APPLICATIONS

This application claims priority to U.S. Provisional Patent Application No. 61/926,803, filed Jan. 13, 2014, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to methods of electrically changing the catalytic behavior, including efficacy and efficiency, of catalysts, and more particularly to methods of changing the catalytic behavior of catalysts disposed on a layer of a material.

BACKGROUND

Catalysts are materials that can change the rate of a chemical reaction without being consumed by the chemical reaction themselves. Catalysts may allow reactions to be carried out in moderate conditions (e.g., lower temperatures and pressures) by involving different transition states or lower activation energies. For example, noble metals (e.g., gold (Au), silver (Ag), platinum (Pt), and palladium (Pd)) are widely used in catalytic converters in vehicle exhaust systems.

The lack of choices of noble metals generally limits their performance as catalysts. In order to more efficiently and effectively use these noble metals as catalysts, different substrates have been tested to change the chemical potentials of the noble metals through charge transfer. Unfortunately, however, such chemical potential changes are generally on a scale too small to introduce a significant/drastic change in the catalytic behavior of the noble metals.

SUMMARY

Devices for and methods of changing the catalytic behavior of a catalyst disposed on a layer of material, which simultaneously may be used as the carrier for the catalyst, are disclosed herein.

One innovative aspect of the subject matter described in this disclosure can be implemented in a device including a substrate, an electrically insulating layer disposed on the substrate, a layer of material disposed on the electrically insulating layer, and a catalyst disposed on the layer of material. The substrate comprises an electrically conductive material. The substrate and the layer of material are electrically coupled to one another and configured to have a voltage applied across them.

Another innovative aspect of the subject matter described in this disclosure can be implemented in a method including providing a device and applying a voltage across the substrate and the layer of material of the device. The voltage changes a charge of the catalyst. The device includes a substrate, an electrically insulating layer disposed on the substrate, a layer of material disposed on the electrically insulating layer, and a catalyst disposed on the layer of material. The substrate comprises an electrically conductive material. The substrate and the layer of material are electrically coupled to one another and configured to have a voltage applied across them.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
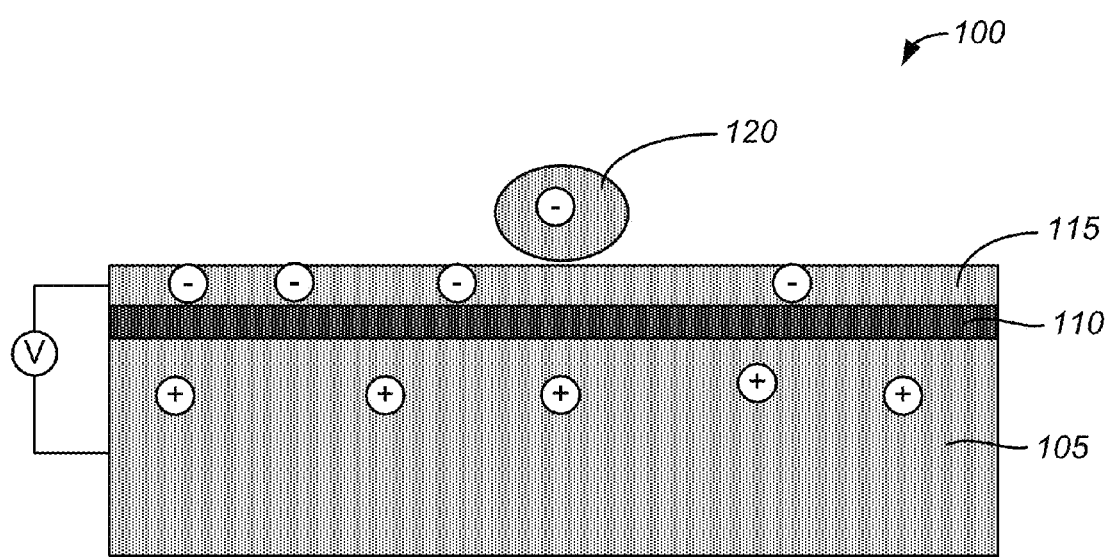
FIG. 1 shows an example of a cross-sectional schematic illustration a catalytic device.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Introduction

Charge transfer during molecular adsorption processes at interfaces can significantly alter the physical and chemical properties of a material surface and the adsorbed molecules. Based on the adsorption-induced electrical conductivity changes in nanomaterials, such as semiconductor nanowires or graphene, chemical sensors capable of detecting the adsorption and the conformation dynamics at the singlemolecular level have been realized. On the other hand, the extent of the charge transfer determines the chemical activity of adsorbed molecules and nanocatalysts, which is important in controlling the reaction rate and product distribution in heterogeneous catalytic processes.

Intuitively, applying an external electrical potential across an interface is an efficient way to induce interfacial charge transfer; this has been applied to many energetically challenging solution-phase chemical conversions through electrolysis processes with high energy efficiency. Electrolysis studies show that in order to activate a chemical reaction, an electrical field on the order of 1.0 V/nm is typically required at the electrode surface. The technological difficulty in establishing such a large field at gas/solid interfaces has long been a roadblock in developing electrically-activated gas-phase catalytic processes. For many energetically challenging chemical reactions, an electrically-activated process is potentially more energy-efficient than the thermal-activated process.

In the past decade, progress has been made both in the fundamental understanding of chemisorption-induced charge transfer at gas/solid interfaces and in manufacturing nanostructured catalytic devices. This progress has led to several new approaches that are aimed at controlling gas-phase heterogeneous catalytic processes by an external electrical potential. For example, by manipulating the electron density in a $SnO_2$ nanowire through a back-gate potential, the conductance evolution of the nanowire suggests that the rate of CO oxidation on the nanowire surface can be effectively controlled. It was also demonstrated that the rate of CO oxidation on a thin Pt film (e.g., ~5 nm) deposited on n-doped Si can be tuned by applying a variable electrical potential across the Schottky barrier at the Pt/n-Si interface. However, in these experiments, it was difficult to directly measure the reaction activation energy, information needed for understanding and optimizing a catalytic process, due to either the thermal stability of the nanostructured device or undetectable changes in the reagent concentrations.

Disclosed herein are catalytic devices that utilize the catalytic properties of nanocatalysts (e.g., gold nanocatalysts) and the electrical properties of thin layers of materials (e.g., a graphene monolayer). These catalytic devices may provide control of a gas-phase heterogeneous catalytic process. For example, an electrical bias can lower the reaction activation energy of CO oxidation over a catalytic device, and make the reaction more energetically favorable.

Devices and Methods

Figure 2:
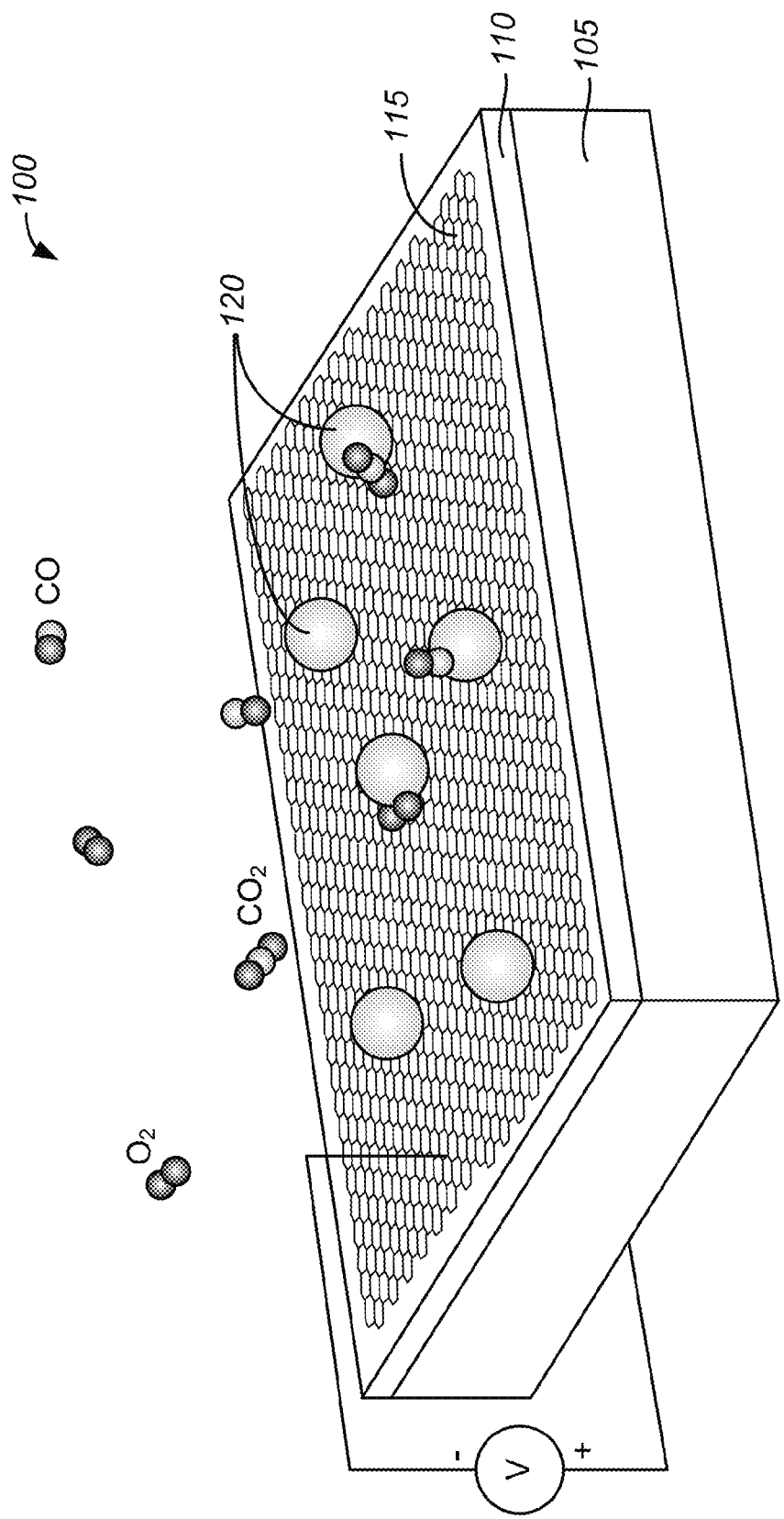
FIG. 2 shows an example of an isometric illustration of a catalytic device.

FIG. 1 shows an example of a cross-sectional schematic illustration a catalytic device. FIG. 2 shows an example of an isometric illustration of a catalytic device. A catalytic device 100 shown in FIGS. 1 and 2 includes a substrate 105, an oxide layer 110 disposed on the substrate 105, a layer of material 115 disposed on the oxide layer 110, and a catalyst 120 disposed on the layer of material 115. The substrate 105 and the layer of material 115 are electrically coupled to one another and configured to have a voltage applied across them. That is, a voltage is configured to be applied across the substrate 105 and the layer of material 115.

In some embodiments, the substrate 105 includes an electrically conductive material. For example, the substrate 105 may be doped silicon (e.g., highly-doped silicon) or a metal. In some embodiments, the oxide layer 110 comprises silicon oxide, aluminum oxide, hafnium oxide, or zirconium oxide. In some embodiments, the oxide layer is about 100 nanometers (nm) to 400 nm thick. For example, the oxide layer may be about 200 nm thick or about 300 nm thick.

In some embodiments, the layer of material 115 comprises a two-dimensional material. A two-dimensional material, for example, is a material of a single atomic layer. In some embodiments, the layer of material 115 comprises a monolayer of graphene, a plurality of monolayers of graphene, graphene oxide, molybdenum disulfide, tungsten disulfide, or tungsten diselenide. In some embodiments, when the layer of material comprises graphene, the layer of material is at least about 0.35 nm thick or about 0.35 nm to 0.7 nm thick. Some layers of materials may be operable to provide a high surface charge density when combined with a back gate (i.e., the substrate 105). This surface charge can change the surface state of the catalyst 120, which may change the catalytic properties of the catalyst 120.

In some embodiments, the catalyst comprises a noble metal or alloy. For example, in some embodiments, the catalyst comprises gold, silver, platinum, palladium, or a platinum-palladium alloy. In some embodiments, the catalyst comprises a more common material, such as nickel, iron, copper, molybdenum disulfide, or a metal oxide, for example. In some embodiments, the catalyst comprises a plurality of islands of material that are about one layer or a few layers thick. That is, in some embodiments, the catalyst comprises a plurality of separate spots or depositions of the catalyst, with each of the plurality of separate spots or depositions of the catalyst being separated from one another. In some embodiments, each island of the plurality of islands of material has a dimension substantially parallel to a surface of the layer of material 115 of at least about 1 nm, about 1 nm to 5 nm, or about 2.5 nm. For example, when the islands are circular in shape, the diameter of an island may be at least about 1 nm, about 1 nm to 5 nm, or about 2.5 nm. In some embodiments, each island of the plurality of islands of material may be a cluster or grouping of about 1 atom to $1\times10^6$ atoms, about 1 atom to 1000 atoms, or about 1 atom to 100 atoms.

Variations of the catalytic device 100 may be possible. For example, in some embodiments, the oxide layer 110 may be a layer of a different class of materials that is electrically insulating (e.g., a polymer layer or barium titanate).

A catalytic device may be fabricated using techniques known to a person of ordinary skill in the art. For example, when highly-doped silicon is used as a substrate, an oxide layer may be formed on the substrate by oxidizing a surface of the substrate or by depositing the oxide layer on a surface of the substrate. The layer of material may then be formed on the oxide layer or formed and then placed on the oxide layer. The catalyst can be deposited on the layer of material using a physical vapor deposition technique, such as thermal evaporation, for example. The catalyst can also be deposited with a spin-coating process. For example, solutions containing metal clusters (e.g., $Au_{25}$ nanoclusters) can be spin-coated on the layer of material.

Figure 3:
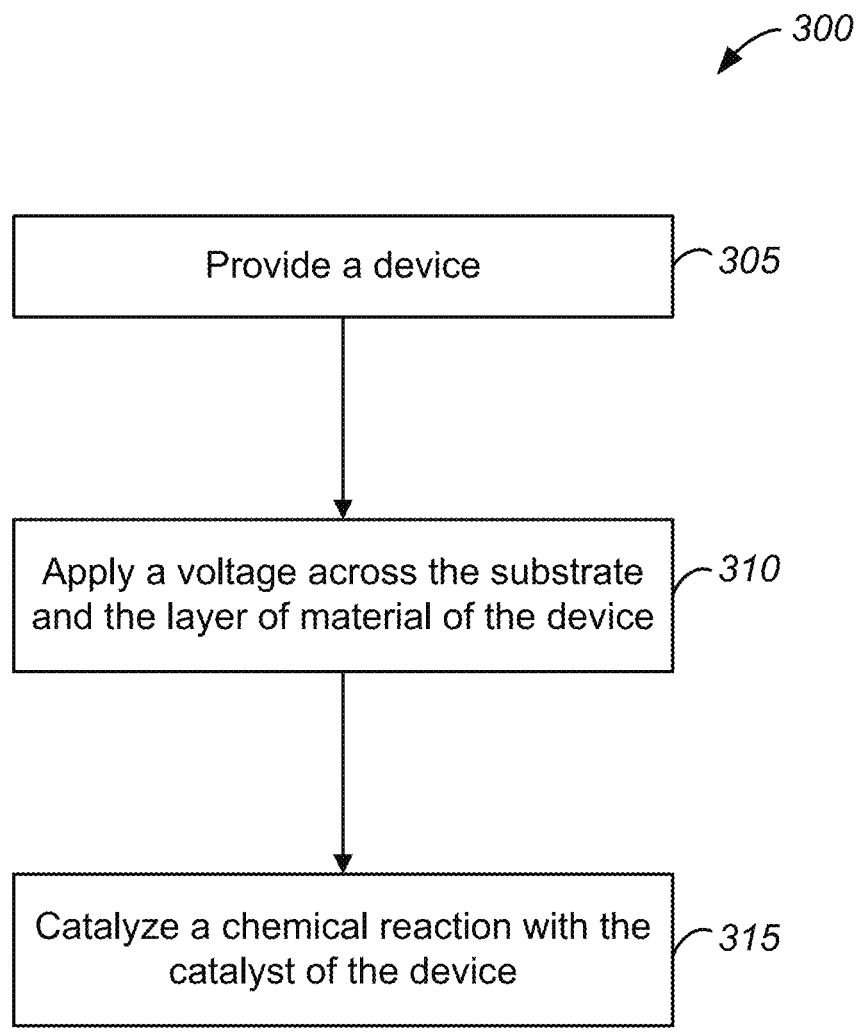
FIG. 3 shows an example of a flow diagram illustrating a method of use of a catalytic device.

FIG. 3 shows an example of a flow diagram illustrating a method a use of a catalytic device. The method 300 of using a catalytic device may be applicable to any of the catalytic devices disclosed herein, including the catalytic device 100 shown in FIGS. 1 and 2.

Starting at block 305 of the method 300, a device is provided. Again, the device may be any of the catalytic devices disclosed herein. At block 310, a voltage is applied across the substrate and the layer of material of the device. In some embodiments, the applied voltage causes the substrate to become charged (i.e., positively charged by the transfer of electrons away from the substrate or negatively charged by the transfer of electrons to the substrate) and the layer of material to become charged with an opposite charge (i.e., negatively charged by the transfer of electrons to the layer of material or positively charged by the transfer of electrons away from the layer of material). Some of the charge of the layer of material may be transferred to the catalyst by electron transfer to or from the catalyst (e.g., forming a negatively or a positively charged catalyst).

In some embodiments, the voltage is about 50 volts to 200 volts, or about 100 volts. For example, the voltage may be about 100 volts when the oxide layer is about 300 nm thick. When the oxide layer is thicker, a higher voltage may be applied; the voltage applied may be proportional to the thickness of the oxide layer. In some embodiments, the charge of the catalyst lowers the activation energy of a chemical reaction that the catalyst may catalyze. For example, in one experiment, the activation energy of the chemical reaction was reduced from about 10 kcal/mol to about 3 kcal/mol.

At block 315, a chemical reaction is catalyzed with the catalyst of the device. A catalyzed chemical reaction has a lower activation energy than a corresponding uncatalyzed reaction. A lower activation energy may result in a higher reaction rate for the catalyzed reaction compared to the uncatalyzed reaction at the same temperature. For example, the activation energy of the reaction may be reduced by an increase in the binding energy between a species of the reaction and the catalyst, due to the charge of the catalyst. In some embodiments, the voltage applied across the substrate and the layer of material may be changed. This change in the applied voltage may change the magnitude of the charge of the catalyst, increasing or decreasing the catalytic activity of the catalyst and subsequently the reaction rate and the starting temperature of a chemical reaction that the catalyst is catalyzing.

The chemical reactions that the method 300 may be used to catalyze include any chemical reaction in which a catalyst is used. The chemical reactions may occur in a liquid environment or a gaseous environment. For example, the method 300 may be used to convert toxic byproducts of combustion in automobile exhaust to less toxic substances (e.g., carbon monoxide oxidation). The method 300 may also be used to covert byproducts, such as carbon monoxide and nitrogen monoxide, in the exhaust produced by some electrical power generation processes. As another example, the method 300 may be used for water splitting, in which water is separated into hydrogen and oxygen (e.g., when the catalyst of the catalytic device is molybdenum disulfide).

Embodiments of the methods disclosed herein can also be used to change a poor catalyst material into a good catalyst material; standards used to determine the performance of a catalyst material include activation energy, turn-over frequency, and stability. In one experiment in which gold nanoclusters were used to catalyze CO oxidation, a bias voltage reduced the activation energy from 10 kcal/mol to 3 kcal/mol and increased the turn-over frequency, improving the catalytic performance of the gold nanoclusters.

EXAMPLE

The following example is intended to be an example of the embodiments disclosed herein, and is not intended to be limiting.

In an experiment attempting to effectively control a gas-phase CO oxidation reaction, gold (Au) nanoclusters were selected as the catalyst and graphene was selected as the electrode for a catalytic device, based on following considerations: (1) the catalytic activity of Au nanoparticles is extremely sensitive to their charge state; (2) as a two-dimensional (2D) atomic layer, the electron density of graphene can be readily tuned by an electrical bias; and (3) the change of the electron density in graphene can further affect the charge state of metal adatoms. Thus, by combining the unique properties of these two nanomaterials, a change in the catalytic activity of the Au nanoclusters as their charge states are tuned by an external electrical bias may be realized.

To fabricate a catalytic device, a chemical vapor deposition-grown graphene layer was mechanically transferred from a copper film to a heavily doped Si/SiO$_2$ substrate (i.e., a p-doped silicon substrate). A 290 nm thick SiO$_2$ layer was thermally grown directly on the silicon surface through a dry-oxidation procedure. The 290 nm thick SiO$_2$ layer yielded a leakage current of around 1 μA/cm$^2$ under the harsh operating conditions for the catalytic device: a 50 V bias voltage, and temperatures of about 200° C. to 250° C. The heavily doped Si underneath the 290 nm thick SiO$_2$ layer served as back gate, which allowed for electrically tuning the carrier concentration in the graphene layer. The gold catalyst was fabricated by depositing 0.8 Å of gold onto the graphene layer (about 1.5 centimeters (cm) by 1.5 cm). The deposited gold formed nanometer-sized clusters. The average particle size of each nanometer-sized cluster was about 2.5 nm. The large surface area of the catalytic device aided in ensuring a reliable detection of catalytic conversion rate. An external voltage bias may be applied across the insulating silicon oxide layer to tune the charge density of the graphene and the Au nanoparticles. In the Au/graphene catalytic device, a positive bias produced electron doping of the graphene and Au nanoparticles.

Catalytic property measurements were performed in a stainless steel reactor equipped with four feed-through terminals for applying a back-gate bias to the catalytic device and for monitoring the resistance of the graphene layer. After the catalytic device was exposed a reactant mixture (e.g., 35 torr of CO, 85 torr of O$_2$, and 640 torr of He) at a given temperature, the changes in the gas concentrations were monitored by gas chromatography. To investigate the catalytic response to an external bias, reaction rate measurements were performed in the temperature range of 220° C. to 240° C. under different back-gate biases. The apparent reaction activation energies under 0 V and 50 V back-gate bias were 10 kcal/mol and 3 kcal/mol, respectively. In the catalytic device, the local Joule heating caused by the leakage current was negligible, since the surface area of the Au/graphene was about 1.5 cm by 1.5 cm, and the typical leakage current across the gate insulator was less than 10 μA under the reaction conditions. Therefore, the observed two-fold decrease in the reaction activation energy suggested that applying back-gate bias to the catalytic device can induce a change in the reaction mechanism of CO oxidation.

In general, a heterogeneous catalytic reaction process consists of multiple elementary reaction steps, such as adsorption of reactants, chemical bond rearrangements of surface intermediates, and desorption of product. The slowest step among these elementary steps (i.e., the rate limiting step) determines the overall reaction rate. The apparent activation energy of the overall reaction reflects the energy barrier height of the rate limiting step.

More specifically, CO oxidation on metal catalysts involves the co-adsorption of O$_2$ and CO. On a CO-rich metal surface, the surface vacant sites for the adsorption of O$_2$ are limited, and the reaction has an apparent activation energy roughly equal to the desorption energy of CO, which is higher than that on an oxygen-rich metal surface. An oxygen-rich surface can be achieved by increasing either the oxygen adsorption energy or the ratio of O$_2$/CO concentration in the reaction mixture.

Based on previous reaction studies, the rate limiting step in the above-described experiment with an O$_2$/CO ratio at about 2.5:1 was expected to be the adsorption of molecular oxygen, and the surfaces should be rich in adsorbed CO under the reaction conditions. The observed lowering of the apparent activation energy indicates that a change from a CO-rich surface to an oxygen-rich surface can be induced by a positive bias. A positive bias applied to the catalytic device results in a negatively charged graphene layer. It was previously observed that the activation energy on platinum surface switched to a lower value at a O$_2$/CO ratio greater than 25:1. Thus, one possibility is that the adsorption of molecular oxygen is enhanced on the negatively charged graphene surface, which leads to the local increase of the $O_2/CO$ ratio in the surface region, and a lower activation energy. However, an experiment indicated that $O_2$ adsorption was depressed on a negatively charged bilayer graphene, and enhanced on a positively charged bilayer graphene. Therefore, the experimental observation cannot be explained by adsorption on the charged graphene surface.

A positive bias on the catalytic device raises the Fermi level in graphene and induces electron transfer from the graphene layer to the Au nanoclusters. Previous experimental and theoretical research on Au-based catalysts indicates that the charge states of the Au nanoclusters can significantly affect the adsorption energies of CO and $O_2$. On positively charged Au nanoclusters, CO adsorption is favorable. On negatively charged Au clusters, $O_2$ adsorption is enhanced. For example, free $Au^{2-}$ nanoclusters were found to be active for low-temperature CO oxidation, and $Au^2O^{2-}$ was identified by mass spectroscopy as an important reaction intermediates for the further activation of the oxygen double bond; the negatively charged Au nanoclusters bound to oxygen-vacancy F-center defects on a MgO(001) surface also exhibited strong catalytic activity at low temperatures. Detailed quantum ab initio simulations suggested that the electron transfer from the negatively charged Au nanoclusters to the anti-bonding $2\pi^*$ molecular orbital of $O_2$ enhances the adsorption of molecular oxygen and facilitates the chemisorption of oxygen by weakening the oxygen double bond. Thus, the observed lowering of the reaction activation energy in the above-described experiment is likely a consequence of the formation of negatively charged Au nanoclusters on the graphene layer under the positive bias.

To determine the extent of the partial charge transfer between the Au nanoclusters and the graphene layer, the optical properties of graphene and Au nanoclusters under different back-gate biases were investigated. The mid-IR optical spectrum of a graphene monolayer gives information about the Fermi level (or the charge density) in the graphene. The deposition of Au nanoclusters on the graphene layer depressed the magnitude of the Fermi level change induced by each given bias. This is because a monolayer graphene cannot efficiently screen a strong electrical field at the Au/graphene interface, and a partial charge transfer to the gold occurs, which results in a smaller change of the charge density in the graphene layer having Au nanoclusters deposited thereon than that in clean graphene (i.e., graphene having no Au nanoclusters deposited thereon) under a same bias. The difference in the Fermi level changes can be used to estimate the extent of the charge transfer. Calculations suggest that in the catalytic device, about 50% of the total charge is injected into the Au nanoclusters, resulting in 2 net electrons for each cluster on average at 50V.

It is well known that the localized surface plasmon resonance (LSPR) of Au nanoclusters is sensitive to their charge density. For instance, increasing the electron density will increase the restoring force in the plasmonic resonance, which induces blue-shift of the resonance wavelength $\lambda_p$. The magnitude of the shift can be quantitatively calculated using the relation between $\lambda_p$ and charge density N for nanoclusters, $$\lambda_p = \sqrt{\frac{4\pi^2 c^2 m \varepsilon_0}{Ne^2}},$$

where c is the light speed in vacuum, m is the electron mass, $\varepsilon$ is the permittivity of vacuum, and e is the electron charge. In a normalized reflection spectrum of $|R_{Gr+Au}/R_{Gr}|$ under several bias voltages between the graphene layer and the back-gated substrate, the blue-shift of the plasmonic resonance on a negatively charged graphene layer indicated that the electrons in the gold nanoclusters have increased as well. The Fermi level $\varepsilon_F$ of a metal is determined by the electron density N by the relation $$\varepsilon_F = \frac{\hbar^2}{2m}\left(\frac{3\pi^2 N}{V}\right)^{2/3}.$$

Therefore, $$\varepsilon_F \propto \lambda_p^{-\frac{4}{3}}.$$

Resonance wavelength blue-shifting of 60 nm at about 700 nm gives a Fermi level increase of 0.5 eV.

The IR and UV-Vis results presented above all indicate that the charge state of the Au nanoclusters can be effectively tuned through electrically doping the graphene layer. Given the known catalytic behavior of charged Au nanoclusters for the CO oxidation reaction, it may be concluded that the formation of negatively charged Au nanoclusters, which enhance the oxygen adsorption, is responsible for the observed lowering of the apparent activation energy.

CONCLUSION

The embodiments disclosed herein are of interest in the development of electrically activated catalytic processes for gas-phase chemical conversions with high energy efficiency. Further, the ability to electrically modify elementary reaction steps in a chemical reaction provides a new method of controlling catalytic selectivity, a central issue in "Green Chemistry".

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
   a substrate, the substrate comprising an electrically conductive material;
   an electrically insulating layer disposed on the substrate;
   a layer of material disposed on the electrically insulating layer, the substrate and the layer of the material electrically coupled to one another and configured to have a voltage applied across them; and
   a catalyst disposed on the layer of the material, the catalyst comprising a plurality of islands of catalytic material that are each about one layer or a few layers thick, each island of the plurality of islands of the catalytic material having a dimension substantially parallel to a surface of the layer of the material disposed on the electrically insulating layer of about 1 nanometer to 5 nanometers, the catalyst operable to catalyze a chemical reaction.

2. The device of claim 1, wherein the layer of the material disposed on the electrically insulating layer is selected from a group consisting of a monolayer of graphene, a plurality of monolayers of graphene, graphene oxide, molybdenum disulfide, tungsten disulfide, and tungsten diselenide.

3. The device of claim 1, wherein the substrate is selected from a group consisting of doped silicon and a metal.

4. The device of claim 1, wherein the catalyst is selected from a group consisting of gold, silver, platinum, palladium, nickel, iron, copper, and molybdenum disulfide.

5. The device of claim 1, wherein the layer of the material disposed on the electrically insulating layer comprises graphene and is about 0.35 nanometers to 0.7 nanometers thick.

6. The device of claim 1, wherein the electrically insulating layer is selected from a group consisting of silicon oxide, aluminum oxide, hafnium oxide, and zirconium oxide.

7. The device of claim 1, wherein the electrically insulating layer is about 100 nanometers to 400 nanometers thick.

8. The device of claim 1, wherein the each island of the plurality of islands of the catalytic material comprises a nanocluster.

9. The device of claim 1, wherein the layer of the material disposed on the electrically insulating layer comprises a two-dimensional material.

10. A method comprising:
    providing a device including:
        a substrate, the substrate comprising an electrically conductive material;
        an electrically insulating layer disposed on the substrate;
        a layer of material disposed on the electrically insulating layer, the substrate and the layer of the material electrically coupled to one another; and
        a catalyst disposed on the layer of the material, the catalyst comprising a plurality of islands of catalytic material that are each about one layer or a few layers thick, each island of the plurality of islands of the catalytic material having a dimension substantially parallel to a surface of the layer of the material disposed on the electrically insulating layer of about 1 nanometer to 5 nanometers; and
    applying a voltage across the substrate and the layer of the material, the voltage changing a charge of the catalyst; and
    catalyzing a chemical reaction with the catalyst.

11. The method of claim 10, wherein changing the charge of the catalyst lowers the activation energy of the chemical reaction that the catalyst catalyzes.

12. The method of claim 10, wherein the voltage is about 50 volts to 200 volts.

13. The method of claim 10, further comprising:
    changing the voltage applied across the substrate and the layer of the material disposed on the electrically insulating layer, wherein changing the voltage changes the charge of the catalyst and changes a reaction rate of the chemical reaction that the catalyst catalyzes.

14. The method of claim 10, wherein the catalyst is selected from a group consisting of gold, silver, platinum, palladium, nickel, iron, copper, and molybdenum disulfide.

15. The method of claim 10, wherein the layer of the material disposed on the electrically insulating layer is selected from a group consisting of a monolayer of graphene, a plurality of monolayers of graphene, graphene oxide, molybdenum disulfide, tungsten disulfide, and tungsten diselenide.

16. The method of claim 10, wherein the layer of the material disposed on the electrically insulating layer comprises graphene and is about 0.35 nanometers to 0.7 nanometers thick.

17. The method of claim 10, wherein the electrically insulating layer is selected from a group consisting of silicon oxide, aluminum oxide, hafnium oxide, and zirconium oxide.

18. The device of claim 1, wherein each island of the plurality of islands of the catalyst material comprises about 1 atom to $1 \times 10^6$ atoms.

19. The device of claim 10, wherein the each island of the plurality of islands of the catalytic material comprises a nanocluster.

20. A device comprising:
    a substrate, the substrate comprising an electrically conductive material;
    an electrically insulating layer disposed on the substrate;
    a layer of material disposed on the electrically insulating layer, the substrate and the layer of the material electrically coupled to one another and configured to have a voltage applied across them; and
    a catalyst disposed on the layer of the material, the catalyst comprising a plurality of islands of catalytic material comprising gold nanoclusters, each island of the plurality of islands of the catalytic material having a dimension substantially parallel to a surface of the layer of the material disposed on the electrically insulating layer of about 1 nanometer to 5 nanometers, the catalyst operable to catalyze a chemical reaction.

* * * * *